United States Patent

[11] 3,627,990

[72] Inventor Max E. Sallach
Chesterland, Ohio
[21] Appl. No. 11,613
[22] Filed Feb. 29, 1960
[45] Patented Dec. 14, 1971
[73] Assignee Addressograph-Multigraph Corporation
Cleveland, Ohio

[54] SENSING MECHANISMS
11 Claims, 13 Drawing Figs.

[52] U.S. Cl. .................. 235/61.11 E, 250/219 R
[51] Int. Cl. .................. G06k 7/10, G01n 21/30
[50] Field of Search .................. 235/61.11, 61.115 CR, 61.115, 61.111, 61.113; 250/219.4; 200/46

[56] References Cited

UNITED STATES PATENTS 2,817,480 12/1957 Baldwin .................. 235/61.7
2,921,736 1/1960 Hatherell et al. .................. 235/61.11

*Primary Examiner*—Daryl W. Cook
*Attorney*—Kinzer, Dorn and Zeckert

ABSTRACT: A card reader for perforated record cards and the like including a card transport for passing the cards individually through a sensing station, and a timing signal generator, driven synchronously with the card transport, for generating an initial timing signal of *n* pulses for a card movement equal to the spacing between adjacent data columns. The card reader further includes control means, comprising photocells or other sensors for sensing the leading and trailing edges of each card, that develops a control signal indicative of the presence of a card at the sensing station. The control signal actuates a gate to supply the initial timing signal to a countdown circuit, having a countdown factor of 1/*n*, only when a card is in the sensing station. The countdown circuit develops a second timing signal comprising a series of pulses timed to coincide with movement of each data column on the card past a sensing position in the sensing station, timing the reading of data from the card. A reset circuit, actuated by the control signal, resets the countdown circuit each time a new card enters the sensing station.

INVENTOR.
MAX E. SALLACH
BY
Wallace and Cannon
Att'ys.

INVENTOR.
MAX E. SALLACH
BY
Wallace and Cannon
Attys.

INVENTOR.
MAX E. SALLACH
BY
Wallace and Cannon
Att'ys.

INVENTOR.
MAX E. SALLACH
BY
Wallace and Cannon
Att'ys.

INVENTOR.
MAX E. SALLACH
BY Wallace and Cannon
Att'ys.

INVENTOR.
MAX E. SALLACH
BY
Wallace and Cannon
Att'ys.

SENSING MECHANISMS

This invention relates to a new and improved sensing mechanism and more particularly to a high-speed data sensing mechanism for sensing the data on record cards or like business instruments during relatively rapid movement thereof through a sensing station.

In many business machines and related apparatus, it is necessary to sense and interpret the data carried by record cards or similar business instruments in order to carry out any one of a number of different business operations. For example, if the business instruments bear data relating to financial transactions, it may be necessary to read and interpret the data on the cards for accounting purposes. If the business instruments are utilized to control a printing machine, it may be necessary or desirable to sense and interpret the data thereon in order to control different aspects of the printing operation, such as multiple printing from a single instrument, omission of printing from instruments of a given class, or like operations. Usually, the significant data used to control operations of this general type is provided in the form of perforations located in a predetermined pattern of columns and rows on the instruments. On the other hand, the data may be in the form of code markings on the cards, which may be formed with ordinary ink or which may comprise a special ink particularly adapted for a given type of sensing operation, such as special magnetic and conductive inks.

In general, there are two basic approaches to the problem of sensing of data from record cards or similar business instruments. In one instance, the record cards may be fed individually to a sensing station which is provided with a large number of sensing elements corresponding to the total number of possible data locations in the portion of the card to be sensed. In a sensing mechanism of this kind, the card is positioned momentarily in a fixed location and all of the data borne by the card, whether in the form of perforations or code markings, are read simultaneously. Thereafter, the business instrument is ejected from the sensing station and the next record card id fed into the sensing station.

In the second basic type of sensing mechanism, which is usually utilized where it is desirable to increase the speed of the sensing operation, the data from the business instruments are sensed and interpreted while the instruments are being moved through a given sensing station. In a device of this kind, in which the data are effectively sensed on-the-fly, it is customary to provide only a relatively small number of sensing elements, corresponding to the total number of data in a given column or row. In order to interpret the data accurately and intelligently, it is necessary to provide some means for determining which column of the record card data is instantaneously located at the sensing position in the sensing station. For this purpose, it has been customary to provide some kind of a commutator to generate timing signals synchronized with the column-by-column movement of the card or other business instrument through the sensing station; these signals make it possible to determine just what column is being read. Known commutator apparatus of this kind must, however, be accurately synchronized with card movement. Previously known devices of this kind have usually required the presence of a special aperture or marking on the card for initiating operation of the commutator apparatus; alternatively, the commutator apparatus may be constructed for actuation by sensing the position of one edge of the card, in which case the commutator is dependent upon precise location of the data columns on the business instrument with respect to one or more edges thereof.

Although known types of sensing mechanism for sensing the data from record cards or the like while the latter are being moved at relatively high speeds have been successful, to a substantial extent, known devices of this kind have presented certain limitations which tend to reduce the speed or accuracy of the sensing operation. In the first place, and particularly where the record cards or business instruments may be prepared by a number of different machines at different locations, it is frequently difficult to maintain the requisite precision in location of the data columns on the cards relative to one or more edges thereof. As a consequence, it may be necessary to sacrifice some degree of accuracy, in the interest of speed, in systems of this kind. On the other hand, and particularly where the commutator apparatus operates continuously, it may be necessary to interrupt movement of the cards or at least to adjust the speed of movement so that the cards enter the sensing station in synchronism with initiation of the commutation operation. This is particularly true in machines in which a card transport feeds the record instruments through the sensing station in one direction but the cards are fed through the transport in a different direction. Furthermore, in instances in which even relatively minor variations occur in the spacing between individual columns of data on the business instruments, the commutator apparatus may fail to give an adequately accurate indication of the column location of the data, with the result that the sensing operation is substantially disrupted.

It is an object of the invention, therefore, to sense and interpret code data from record cards or similar business instruments, while the business instruments are being moved rapidly through a sensing station, without engendering the above-noted difficulties and disadvantages present in previously known sensing devices.

A further object of the invention is to provide a new and improved sensing mechanism for reading data indications from record cards or similar business instruments which is inherently self-synchronizing and which does not depend, for its operation, upon initial synchronization of card movement through the sensing station.

A further object of the invention is to compensate for relatively large variations in data locations, on a record card or similar business instrument, in the course of reading and interpreting the data from the card. More particularly, it is an object of the invention to compensate, in a high-speed sensing mechanism, both for variations in data location on the card relative to the edges of the card and for internal spacing variations between data items on the card.

An additional object of the invention is to eliminate any need for accurate control of the speed of card movement through a sensing station in which data on the card is sensed without interruption of card movement.

An additional object of the invention is to provide a relatively simple and inexpensive timing mechanism for correlating and interpreting the sensing of code data from record cards or similar business instruments, on-the-fly, which is also effective to compensate for substantial variations in data location on the card and relative to the edges on the card.

Accordingly, the present invention relates to a sensing mechanism for reading data indications, including either perforations or markings, from record cards or similar business instruments upon which the data indications are arranged in a plurality of data columns or rows each spaced from the adjacent column by a given distance. A sensing mechanism constructed in accordance with the invention may comprise a card transport for moving the record cards one-by-one past a sensing station, preferably at a relatively high speed. Timing means, operable in synchronism with the card transport, are provided for generating an initial timing signal comprising $n$ output pulses occurring during each time interval in which the transport moves a record card through the sensing station by a distance equal to the aforementioned data column spacing distance. Control means are incorporated in the sensing mechanism to generate a control signal indicative of the presence of a record card at the sensing station. Preferably, this control means generates a first control signal upon entrance of the record card into the sensing station and subsequently develops a second control signal indicative of movement of the card out of the sensing station. A countdown circuit is provided in the sensing mechanism, the countdown factor of this circuit being $1/n$. A coincidence circuit is connected between the timing means and the countdown circuit and is also connected to the control means; this coincidence circuit is utilized to apply the initial timing signal developed by the timing means to the countdown circuit only when a control signal is applied thereto showing that a card is present in the sensing station. The sensing mechanism further includes means for sensing the presence of data indications on the record cards or similar business instruments as the cards move passed the sensing station to generate data signals representative thereof. This sensing means may comprise any one of a variety of different kinds of sensing elements, including brushes for sensing the presence of card apertures or conductive markings, magnetic sensing elements for sensing the presence of magnetic markings on the cards, or photoelectric sensing elements, the latter type of sensing element being utilized in the preferred embodiment of the invention described in detail hereinafter. The data signals generated by the sensing means, and the second timing signal developed by the countdown circuit, are applied to a data utilization means, which employs both signals conjointly to analyze and interpret the data on the record cards.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing form the present invention and the purview of the appended claims.

Figure 1:
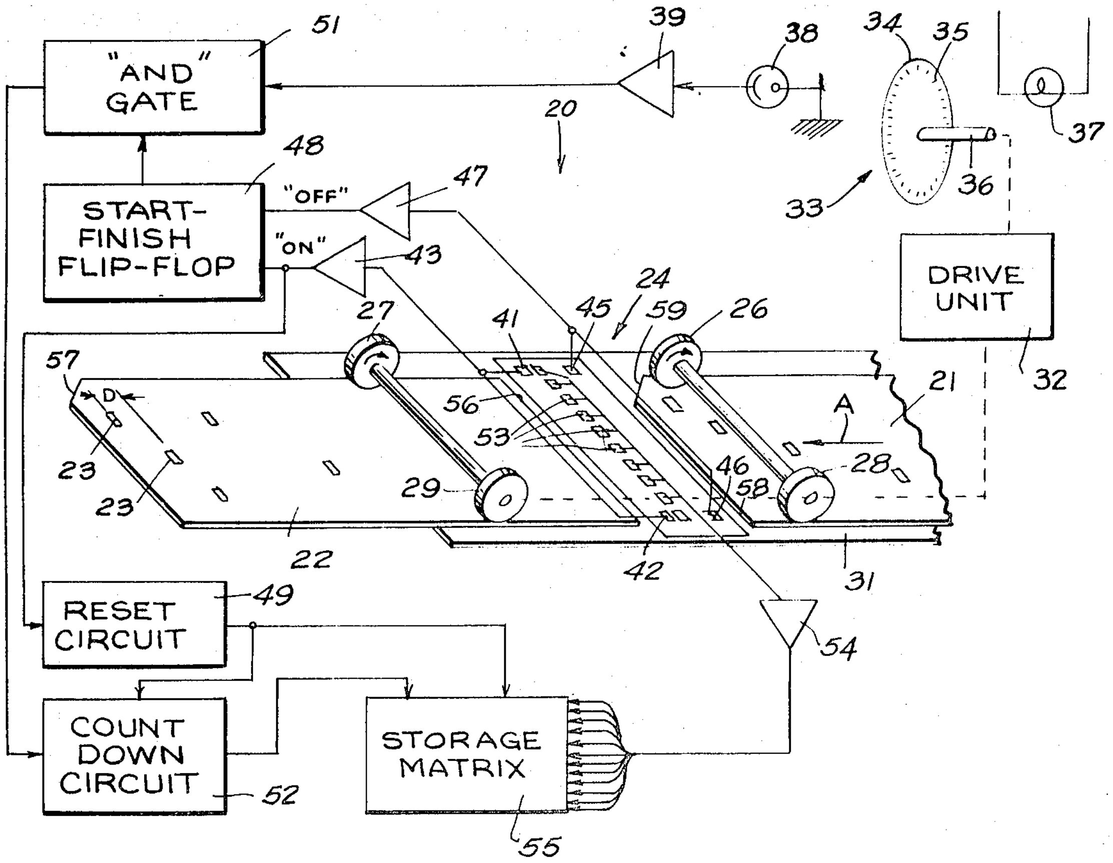
FIG. 1 is a schematic diagram, partly in block form, of a sensing mechanism constructed in accordance with one embodiment of the invention.

FIG. 1 illustrates, in schematic and block diagram form, a sensing mechanism 20 constructed in accordance with one embodiment of the invention. As described hereinafter, the sensing mechanism 20 is effective to read data from business instruments, such as the record cards 21 and 22, which are provided with data indications arranged in a plurality of data columns on the record cards. In this instance, the business instrument such as the record card 22 is provided with data apertures 23; on the other hand, the data indications could be in the form of data markings, such as ordinary ink markings or conductive or magnetic ink markings. Each of the data columns on the individual business instruments 21 and 22 are separated from the adjacent columns of data by a given inter-column spacing distance D, as indicated on the card 22.

The sensing mechanism 20 includes a sensing station 24 through which the record cards are moved, during a sensing operation, by means of a card transport comprising the drive rollers 26, 27, 28 and 29. The card transport, which may also include suitable guiding and positioning means generally indicated by the table 31, moves the cards through the sensing station 24 in the direction indicated by the arrow A. The card transport further includes a suitable drive unit 32 connected in driving relation to the drive rolls 26–29, as schematically indicated in FIG. 1; the particularly type of drive selected for the card transport is not critical to the present invention, and any desired form of drive apparatus may be employed for this purpose.

The sensing mechanism 20 of FIG. 1 further includes timing means, generally indicated by the reference numeral 33, for generating an initial timing signal comprising $n$ output pulses occurring during each time interval in which the card transport moves one of the business instruments, such as the cards 21 and 22, through the sensing station 24 by a distance equal to the data column spacing distance D. The timing means 33 comprises a timing disc 34 having a multiplicity of transparent areas or slots 35 distributed in a regular pattern around the periphery thereof. The timing disc 34 is mounted upon a shaft 36 which is mechanically connected to the drive unit 32 to afford a means for rotating the disc 34 in synchronism with operation with the card transport. In the preferred embodiment of the invention described in greater detail hereinafter in connection with FIGS. 2–13, the transparent areas 35 around the rim of the disc 34 are equal in number to $n$ times the total number of data columns on each of the business instruments such as the cards 21 and 22. Thus, assuming that $n$ is equal to 10, and that the sensing mechanism 20 is employed with conventional 80-column cards, there would be 800 transparent areas 35 in the timing disc 34, providing that the shaft 36 is rotated through one complete revolution during the time in which a record card is advanced completely through the sensing station 24. However, the number $n$ can be made larger or smaller, if desired, and the drive ratio for the shaft 36 may also be adjusted to any other integral number of revolutions during each time interval in which a card is advanced through the sensing station. Indeed, the drive connection between the transport drive unit 32 and the timing disc 34 may be such that the disc is rotated through only a fractional portion of a revolution each time a card is advanced through the sensing station, in which case it is necessary to increase the number of timing slots or transparent areas in the timing disc in inverse proportion to the change of the rotational speed of the disc.

The timing means 33 further includes a lamp 37 arranged to illuminate a photocell 38 through the transparent portions 35 of the timing disc 34. The photocell 38 is electrically coupled to a suitable amplifier 39 which may also be considered to constitute a part of the timing means 33.

Control means are also provided, in the sensing mechanism 20, for generating one or more control signals indicative of the presence of a business instrument, such as one of the record cards 21 and 22, in the sensing station 24. The control means, in the embodiment of FIG. 1, comprises a pair of card presence sensing elements 41 and 42 which are located at opposite sides of the sensing station and which are electrically connected to each other and to an amplifier 43. The control elements 41 and 42 could constitute feeler fingers or similar elements for physically sensing the movement of the leading edge or one of the record cards into the sensing station. Preferably, however, and as described in greater detail hereinafter, the elements 41 and 42 comprise photosensitive sensing elements for determining the entrance of a record card into the sensing station. The control means for the embodiment of FIG. 1 further includes a second pair of card presence sensing elements 45 and 46 which may be essentially similar to the sensing elements 41 and 42 but which are positioned to sense the movement of the trailing edge of one of the business instruments past the sensing station 24. The sensing elements 45 and 46 are electrically connected to each other and to an amplifier 47. The two amplifiers 43 and 47 are coupled to a start-finish flip-flop or trigger circuit 48, which also comprises a part of the control means for the sensing mechanism 20, whereas the amplifier 43 is also connected to a reset circuit 49 that is utilized as a part of the control means.

The output amplifier 39 of the timing means 33 is coupled to the input of a coincidence circuit shown in FIG. 1 as the AND-gate 51. The start-finish flip-flop 48 is also coupled to the AND-gate 51, which is effective to pass the initial timing signal from the amplifier 39 only in the presence of a suitable signal from the flip-flop circuit 48 indicative of the presence of a record card at the sensing station 24. That is, there is no effective timing signal output from the AND-gate 51 except when a record card is present in the sensing station 24. The output signal from the AND-gate 51 is applied to a countdown circuit 52 having a countdown factor of $1/n$.

The sensing mechanism 20 is also provided with sensing means, at the station 24, for sensing the data indications such as the apertures 23 in the record cards, as the cards are moved through the sensing station. In this instance, the sensing means comprises a plurality of individual photoelectric sensing elements 53 equal in number to the total number of data positions in any given column on the record cards. Thus, for a sensing mechanism intended for operation with conventional record cards of the kind having 12 data positions in each column, there would be 12 photocells 53 incorporated in the sensing means located at the sensing station 24. It will be understood that the record cards could be moved through the sensing station 24 laterally instead of longitudinally, in which case it is necessary to provide one sensing element for each data position in a given longitudinal row that is to be sensed. Throughout this specification, and in the appended claims, any reference to data columns is intended to refer also to data rows where sensing may be accomplished on a row-by-row basis instead of a column-by-column basis. The photoelectric sensing elements 53 are individually connected to an amplifier unit 54, which preferably includes an individual amplifier stage associated with each of the sensing elements, as described more fully hereinafter in connection with FIG. 12.

To complete the sensing mechanism, it is, of course, necessary that there be some means for utilizing the data signals from the sensing elements 53, together with the second timing signal developed by the countdown circuit 52, to interpret and analyze the data on the record cards. In FIG. 1, this data utilization means is illustrated by the storage matrix 55, which is coupled to the amplifier unit 54 to receive therefrom the data signals initially produced by the photocells 53. The storage matrix 55 is also connected to the countdown circuit 52 and to the reset circuit 49. Inasmuch as the present invention is not limited to the use of any particular kind of data utilization means, no detailed illustration of the storage matrix 55 is included herein.

As a typical example of the kind of storage matrix which could be used in this part of the sensing mechanism 20, it may be considered that a conventional magnetic core storage matrix is employed for this purpose. This being the case, the data signals from the amplifier unit 54 may be applied individually to the column windings in the core matrix, and the output signal from the countdown circuit may be applied to a conventional stepping circuit incorporated in the matrix and thus utilized to energize the row windings of the storage matrix, in sequence. The reset circuit 49, on the other hand, may be coupled to the usual reset windings on the magnetic cores. Coincident-energization magnetic core storage devices of this kind are well known in the art, and can readily be coupled to the other circuits of the sensing mechanism to achieve the desired interpretation and analysis of the data from the record cards. Of course, a wide variety of other known data utilization devices can be used if desired.

In considering the operation of the sensing mechanism 20, it may be assumed that the card 22 has just been ejected from the sensing station 24 by the card transport, particularly the rollers 27 and 29. As the trailing edge 56 of the card 22 leaves the sensing station, the photoelectric card presence sensing elements 45 and 46 generate a first control signal which is amplified in the circuit 47 and applied to the start-finish flip-flop 48. This initial control signal actuates the flip-flop circuit to generate an output signal that is applied to the AND-gate 51 and is effective to actuate the gate to a "closed" position, interrupting transmission of the initial timing signal from the timing means 33 to the countdown circuit 52. Consequently, once the card 22 has left the sensing station 24, and no new card has entered the sensing station, the transmission of timing signals to the countdown circuit, and hence to the storage matrix 55, is cut off. Actually, it would not be necessary to employ two sensing elements 45 and 46 to generate the "off" control signal necessary for this operation; instead, a single sensing element such as a photocell or brush, can be used for this purpose. However, it is desirable to locate the sensing elements of the control means outside the normal field in which data markings are located on a record card, in order that the data markings or apertures will not interfere with operation of the card presence sensing elements. This being the case, it is desirable to employ two card presence sensing elements in order to avoid false triggering of the control means in the event that the normal cutoff corner 57 of the card is located at the trailing edge of the card as it is fed through the sensing mechanism.

In the next cycle of operation, as the leading edge 58 of the card 21 enters the sensing station 24, the photoelectric card presence sensing element 42 is actuated and produces a second control signal which is amplified in the amplifier 43 and applied to the start-finish flip-flop 48 and to the reset circuit 49. In this instance, the wisdom of using two card presence sensing elements in the control means is apparent, since the photocell 41 will not be masked by the leading edge 58 of the card 21, due to the location of the cutoff corner 59 of the card 21. The flip-flop 48 is effective to apply a control signal indicative of card presence to the AND-gate 51 which conditions the gate for transmission of the initial timing signal from the photocell 38 and amplifier 39 to the countdown circuit 52. Moreover, the "on" control signal from the amplifier 43 actuates the reset circuit 49 to apply a reset signal to the countdown circuit 52 and to the utilization means comprising the storage matrix 55, clearing both the matrix and the counter for the sensing of data from a new card. The data from the preceding card is read out of the storage matrix before the reset signal is applied thereto, the readout means not being shown.

The construction of the sensing station 24 is such that the control means sensing element 42 is actuated just before the first column of data apertures in the record card 21 moves into position over the individual sensing elements 53 of the data sensing means. At the same time, the AND-gate 51 is being conditioned for transmission, the countdown circuit 52 counts $1/n$ pulses generated by the timing means 33 and produces, in response thereto, a single timing pulse. This pulse is the first pulse in a second timing signal, this being the name applied hereinafter to the output signal from the countdown circuit, and is applied to the storage matrix 55 to energize the first set of column windings in the storage matrix. If a data aperture is present in the first column of the record card 21, one of the sensing elements 53 is illuminated and generates a data signal which is amplified in the amplifier unit 54 and applied to one of the sets of row windings in the storage matrix, resulting in the recording of one bit of information in the storage matrix. Of course, if two or more data apertures are present in the first column on the card 21, all of the data items are individually recorded in the storage matrix in this manner.

As noted hereinabove, the timing means 33 produces $n$ output pulses each time a record card is moved through the sensing station 24 by a distance equal to the spacing D between individual data columns. Accordingly, as the card 21 continues its movement through the sensing station 24, the countdown circuit 52 generates an output pulse, as a part of the aforementioned second timing signal, at a time corresponding to that at which each subsequent data column on a record card is located in sensing position over the photocells 53. Thus, each column of data on the record card 21 is sensed, in the manner described hereinabove, and the data carried by the card are recorded sequentially in the storage matrix 55.

The timing means 33, and the control means associated therewith, together with the countdown circuit 52, afford a versatility in operation and protection against inaccuracies in the record cards which have not been previously achieved in sensing mechanism effective to sense the data from record cards or similar business instruments while the latter are being moved at relatively high speeds through a sensing mechanism. In the first place, the AND-gate 51 prevents the generation of output signals from the countdown circuit 52, by effectively cutting off the input signals thereto, at any time during which there is no record card present in the sensing station 24. That is, the sensing elements 45 and 46 and the flip-flop circuit 48 are effective to "close" the gate 51 each time a record card leaves the sensing station.

Of even greater importance is the fact that there is no necessary correlation between operation of the timing means 33 and the entry of a record card into the sensing station 24, except for the requirement that the speed of the timing disc 34 be directly related to the speed of card movement to obtain the necessary correlation between the number of output pulses from the timing means and movement of the card through a predetermined distance. That is, there is no fixed starting point for operation of the commutator or timing means 33; it can pick up in operation at any instant that a card enters the sensing station 24. Consequently, it is not necessary to have precise control of the timing of card entrance to the sensing station and it is not necessary to maintain any particular critical spacing between the cards as they are fed through the sensing station, except that some small spacing must be maintained to provide for accurate operation of the control means comprising the sensing elements 41, 42, 45 and 46. Stated differently, the only requirement in this regard is that the cards not be fed through the station overlapping or abutting relationship, although even an abutting relation could be accommodated with only minor changes if the cards were consistently fed through the sensing station with the cutoff corners thereof in a predetermined orientation with respect to the sensing station.

At the same time, the sensing mechanism 20 is substantially insensitive to even relatively large variations in the intercolumn spacing of the data on the record cards or in the location of the first and last data columns relative to the edges of the cards. The output signals from the data sensing elements 53 are relatively long in duration, as compared with the individual timing pulses developed by timing means 33 and applied to the AND-gate 51 and thence to the countdown circuit 52 which supplies timing pulses to the matrix 55. Thus, each data signal extends over a period of time sufficient to compensate for considerable variations in relative timing of the timing signals and the data signals, so that the actual spacing between the data columns can change substantially without adversely affecting the sensing operation. This applied equally to similar range of variations in the location of the first column on each card relative to the leading edge thereof. In fact, it has been determined that the sensing mechanism 20 may be constructed to be effective with cards in which the column-to-column spacing may vary by at least as much as 20 percent. Consequently, it is completely unnecessary to utilize any column of the card for synchronization purposes, and the full capacity of the card remains available for use in connection with recorded data. Moreover, the same effect is achieved regardless of modifications in the construction of the timing means 33, so long as the timing means is effective to generate the required $n$ output pulses during the movement of each record card through the sensing station through a distance equal to the average intercolumn spacing D.

Furthermore, the sensing mechanism 20 is not adversely affected, to any substantial effect, by minor variations in the operating speed of the card transport, such as might be caused by fluctuations in power line voltages or the like. Thus, if the card transport slows down, the timing disk 34 slows down proportionally, so that the same number of output pulses are generated as a part of the initial timing signal developed by the photocell 38 during movement of the record card through the average intercolumn spacing distance D. It should be understood, in this connection, that it is not necessary to utilize a photoelectric signal generator such as that shown for the timing means 33; instead, a more conventional commutator device effective to produce output pulses in the same ratio as described hereinabove may be employed if desired. However, the particular timing means 33 utilized in the preferred embodiment of this invention is quite inexpensive and highly accurate in operation, and constitutes one of the preferred individual features of the invention.

Figure 2:
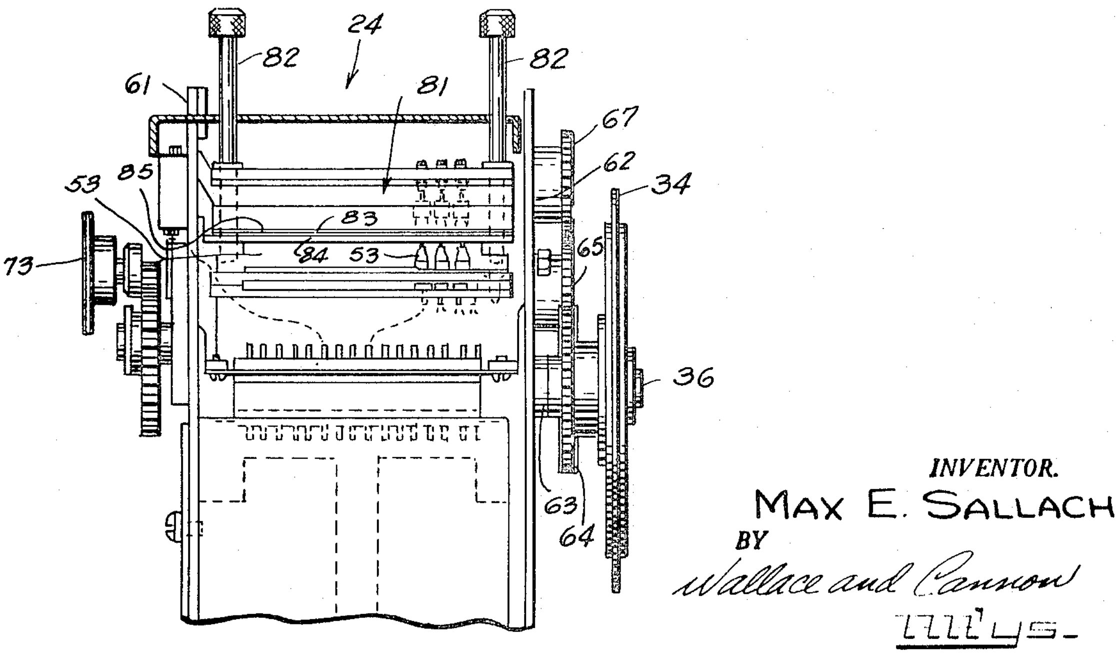
FIG. 2 is a detail sectional view showing the card transport and a part of the commutator or timing means employed in a preferred embodiment of the invention.
Figure 3:
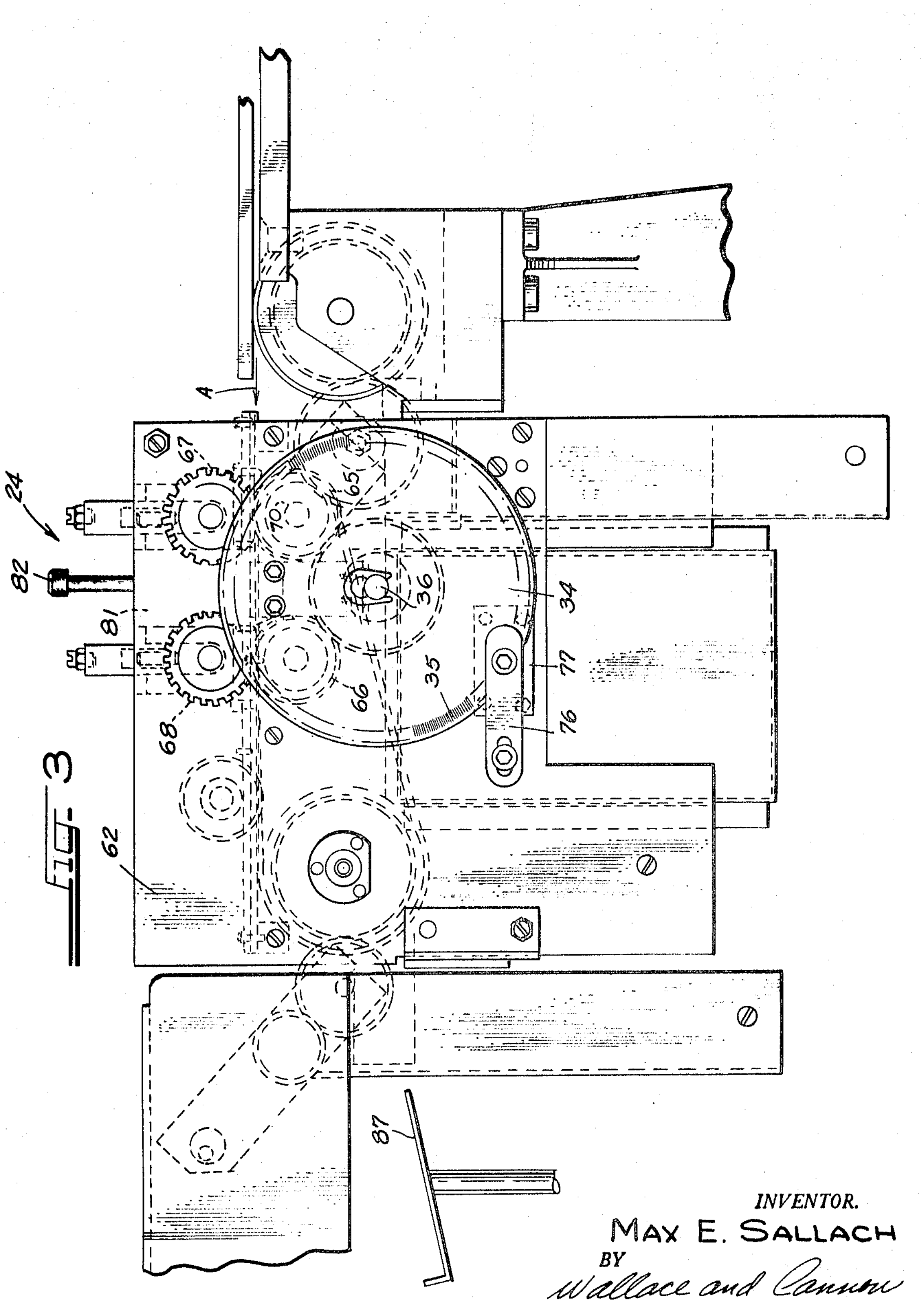
FIG. 3 is a side elevation view of the sensing station of FIG. 2, including the card transport and the timing means illustrated therein.
Figure 4:
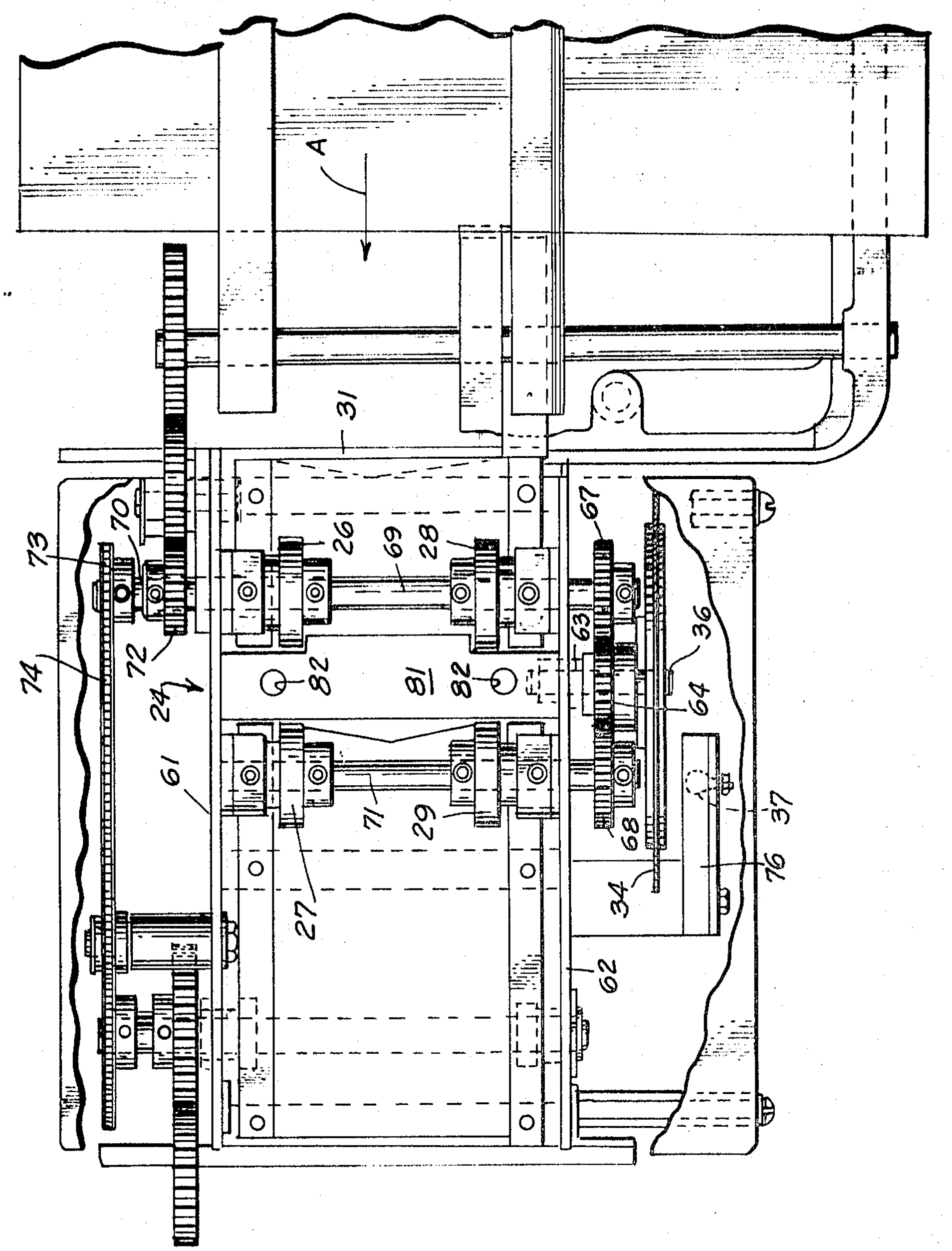
FIG. 4 is a plan view of the sensing station of FIGS. 2 and 3.

The remaining figures in the drawings, other than FIG. 1, illustrate the details of construction of a preferred embodiment of the sensing mechanism 20 described hereinabove in connection with FIG. 1. FIGS. 2, 3 and 4, in particular, illustrate the basic mechanical aspects of the sensing mechanism, in a preferred form, including the card transport, the mechanical elements of the timing means 33, and the common drive utilized for the card transport and the timing means. 07 The mechanical apparatus illustrated in FIGS. 2, 3 and 4 comprises a of side frame members 61 and 62. The operating shaft 36 for the timing disc 34 is mounted in a suitable bearing 63 that is supported upon the frame member 62. A gear 64 is mounted on the shaft 36 for rotation therewith and is disposed in meshing engagement with a pair of gears 65 and 66, as best shown in FIG. 3. The gears 65 and 66, in turn, are disposed in meshing engagement with two gears 67 and 68. The gear 67 is mounted upon a shaft 69 which extends transversely of the sensing station 24 and comprises the operation shaft for the two drive rollers 26 and 28. Preferably, the lower gear 65 is also mounted upon a shaft 70 that extends across the sensing station and carries a pair of further feed rolls that are disposed in alignment with the rolls 26 and 28, so that a card entering the station is moved forward, in the direction of the arrow A by engagement between the two pairs of rollers. Similarly, the gear 68 is mounted upon a shaft 71 that comprises the operating shaft for the two feed rolls 27 and 29 (see FIG. 4). In the preferred construction, the rolls 27 and 29 are juxtaposed to a further pair of feed rolls mounted upon the shaft that carries the gear 66 (see FIG. 3).

As best illustrated in FIGS. 2 and 4, the shaft 70 is extended behind the frame member 61 on opposite side of the machine from the gear 65 and a drive gear 72 is mounted on the outboard end of the shaft. Suitable drive means, including a train operatively connected to the gear 72, are provided for driving the shaft 70 through the gear 72. In addition, a further power takeoff for additional apparatus cooperating with the sensing mechanism of the invention may be provided as by means of a chain drive comprising sprocket 73 mounted on the shaft 70 and a drive chain 74 engaged therewith.

The lamp 37 for the timing means 33 of the sensing mechanism (see FIG. 1) is mounted in a housing 76 that is supported upon the frame member 62, as shown in FIGS. 3 and 4. Preferably, the housing 76 is adjustably mounted on the frame to provide for adjustment of the position of the lamp relative to the transparent areas 35 in the timing disc 34. The timing disc 34 may be formed as a photographic image on a relatively heavy base member, or may comprise an etched plate formed by photoetching or similar means. Alternatively, a relatively thin apertured metal disc may be utilized for the timing disc. In the illustrated embodiment of the invention, which is intended for use with 80-column record cards, there are 800 transparent areas or slots 35 around the rim of the timing disc 34. The photocell for the timing mechanism is mounted upon a mounting plate 77 affixed to the frame member 62, the mounting plate being illustrated in FIG. 3.

Above the central portion of the sensing station 24, as illustrated in FIGS. 2–4, there is mounted a lamp assembly 81 which is held in place by a pair of screws 82. The lamp assembly 81 includes a plurality of individual lamps, equal in number to the number of data positions in an individual column on a record card. The lamps are disposed behind a suitable mask and guide member 83 (see FIG. 2) which limits illumination from each lamp to an individual data position on the card. Of course, the individual lamps in the lamp assembly 81 may be replaced by a single lamp extending across the entire sensing station, if desired.

FIG. 2 also shows the location of the individual data sensing elements 53 below a guide member 84, described more fully hereinafter in connection with FIG. 13. The two members 82 and 84 are separated by an aperture 85 through which the record cards are fed in the course of a sensing operation. Of course, suitable electrical connections are provided to the sensing elements 53, as described in greater detail hereinafter in connection with the schematic diagram of the electrical portions of the sensing mechanism, FIG. 12.

The foregoing description of operation of the mechanical portions of the sensing device of the invention is directly applicable to the apparatus illustrated in FIGS. 2–4. Thus, in the course of a sensing operation, individual record cards are fed into the sensing station 24 by a suitable feeder mechanism (not shown), the direction of feed being indicated by the arrows A in FIGS. 3 and 4. As each record card nears the sensing station, it is engaged by the feed rolls 26 and 28, and the mating drive rolls (not shown) located below the table 31. Thereafter, movement of the card into the sensing station is determined, in speed, by the rate of rotation of the rolls 26 and 28. As described hereinabove, the drive arrangement for the feed rolls is directly connected, through the gears 64–68, to the shaft 36 of the timing disc 34. Consequently, the timing disc 34 is driven at a rotational speed directly related to the rotational speed of the feed rolls and, accordingly, at a speed directly related to the velocity at which cards are fed through the sensing station. As each card moves through the sensing station, it is engaged by the feed rolls 27 and 29 at the outlet end of the sensing station and fed therefrom toward a storage hopper 87 (FIG. 3) or into a subsequent business machine such as a sorting machine or the like.

Figures 5, 6, 7, 8, 9, 10:
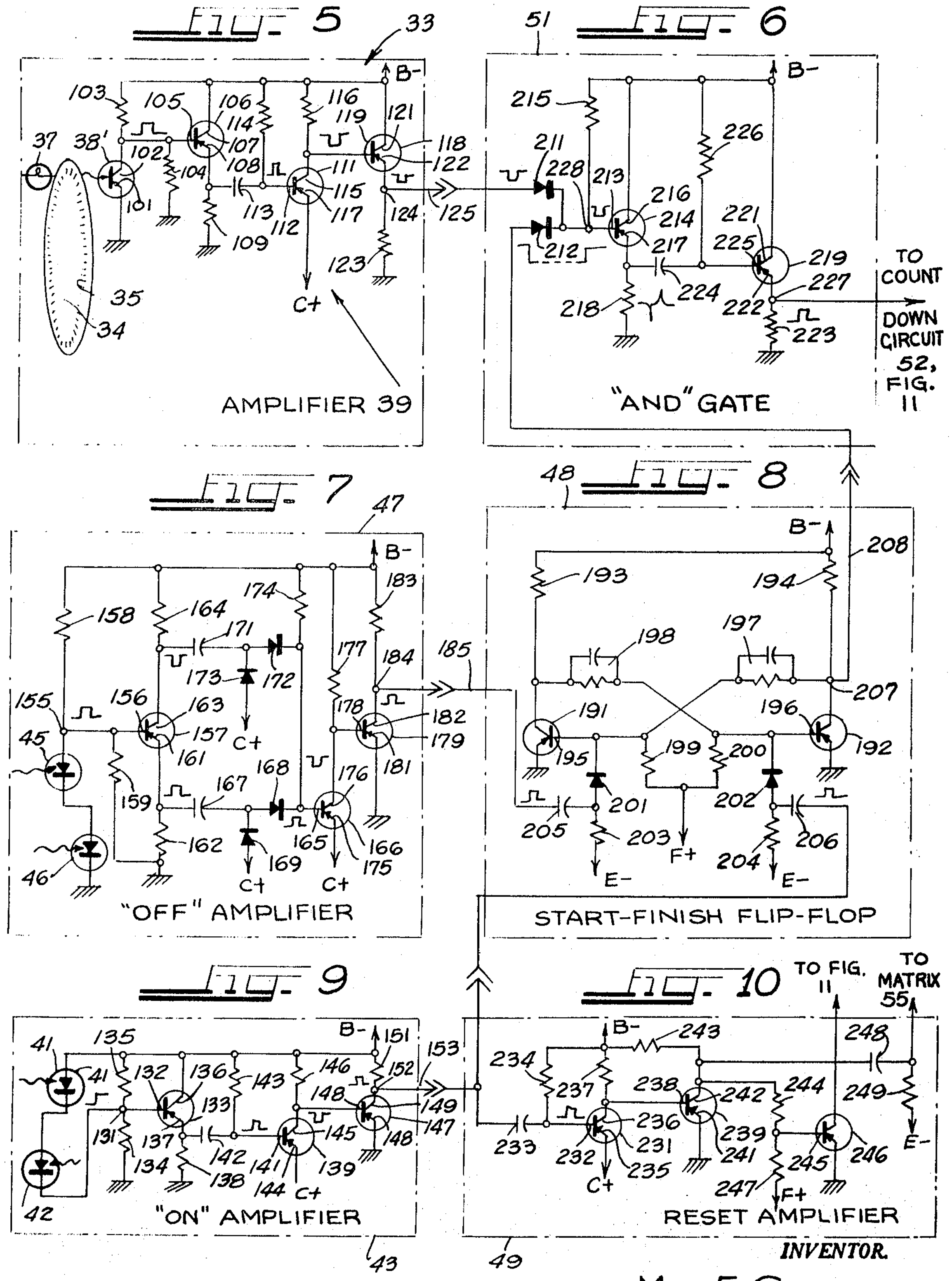
FIG. 5 is a detail schematic drawing of the operating circuit for the timing means employed in a preferred embodiment of the invention.
FIG. 6 is a detail schematic view of coincidence circuit means employed in a preferred embodiment of the invention.
FIG. 7 is a detail schematic view of a particular sensing and amplifying circuit employed as a part of the control means in a preferred embodiment of the invention.
FIG. 8 illustrates another circuit utilized as a part of the control means.
FIG. 9 is a detail schematic drawing of the circuit for another part of the control means.
FIG. 10 illustrates a reset circuit utilized as a part of a preferred embodiment of the invention.

FIGS. 5–10 illustrate several of the various different circuits described generally hereinabove in connection with FIG. 1, the individual circuits being shown in schematic detail. Thus, FIG. 5 illustrates the electronic apparatus for the timing means 33, including the amplifier 39 and the photocell associated with the timing disc 34. FIG. 6 is a detailed illustration of a typical circuit which may be employed for the AND-gate 51, whereas FIG. 7 shows the control amplifier 47, complete with the two photoelectric sensing elements 45 and 46. FIG. 9 illustrates the other control sensing elements 41 and 42 in association with a preferred circuit for the "on" amplifier 43, and FIG. 10 illustrates a typical reset amplifier 49. The start-finish flip-flop circuit 48 is shown in detail in FIG. 8.

In the circuit arrangement illustrated in FIG. 5, a phototransistor 38′ is utilized as the initial pickup element in the timing means 33, being mounted in position for illumination by light originating in the lamp 37 and passing through the timing disc 34. In the illustrated circuit, the emitter 101 of the phototransistor 38′ is connected to a plane of reference potential, here shown as ground, and the collector 102 is connected to a source of unidirectional operating potential, designates as B−, through a resistor 103. The collector 102 is also returned to ground through an output resistor 104 that is connected to the base electrode 105 of a transistor 106 that comprises the first stage in the timing signal amplifier 39.

The transistor 106 is connected in an emitter-follower circuit, the collector 107 of the transistor being connected directly to the operating source B− and the emitter 108 being returned to ground through a load resistor 109. The second stage of the amplifier 39 comprises a transistor 111 having a base electrode 112 that is AC coupled to the emitter of the first stage transistor 106 by means of a coupling capacitor 113. The biasing circuit for the base electrode 112 is provided by a resistor 114 which connects the base electrode back to the potential supply B−. The collector 115 of the second stage transistor 111 is connected to the source B− through a load resistor 116, whereas the emitter 117 is connected to a positive-polarity DC bias source designated as C+.

The timing amplifier 39 includes a third stage, which again is an emitter-follower, this third stage including a transistor 118 having a base electrode 119 which is connected to the collector 115 in the second stage. The collector 121 of the transistor 118 is connected directly to the DC source B−, whereas the emitter is connected through a load resistor 123 to ground. The output terminal of the timing amplifier 39 is indicated by the reference character 124, and is connected by a conductor 125 to the input of the AND-gate 51 of FIG. 6, as described more fully hereinafter.

Operation of the electronic circuit of the timing means 33, as shown in FIG. 5, is relatively simple and straightforward. The phototransistor 38′, when not illuminated, affords a relatively high impedance between the collector electrode 102 and ground. Consequently, the base electrode 105 of the first stage of the amplifier 39 is maintained at a relatively high-negative potential, with respect to ground, whenever the photoelectric pickup device 38′ is not illuminated, the potential on the base electrode 105 being determined by the impedance ratio of the two resistors 103 and 104 under these conditions. Each time the photocell 38′ is illuminated by the lamp 37, projecting its light through one of the slots or transparent areas in the disc 34, however, the effective impedance of the phototransistor is reduced to a value substantially smaller to that of the resistor 104. As a consequence, the negative potential on the base 105 in the input of the amplifier 39 is substantially reduced; stated differently, a positive-going signal pulse is effectively applied to the base electrode 105 of the first stage transistor 106. In this connection, it should be noted that the pulse signals shown in the drawings, in all of the circuit diagrams, are not intended to illustrate actual wave forms or to show polarities relative to ground; rather, these pulse signals indicate only the direction of change in potential for the significant signals developed in or applied to the various circuits.

The positive-going pulse applied to the first stage 106 of the amplifier 39 is effective to generate a similar pulse in the output of this stage. Thus, a positive-going pulse is applied to the input electrode 112 of the second stage transistor amplifier 111 through the AC coupling circuit comprising the capacitor 113. This pulse is amplified and applied to the third stage 118, appearing on the base electrode 119 thereof as a negative-going pulse. Since the final stage of the amplifier 39, comprising the transistor 118, is an emitter-follower, the output signal from the amplifier applied to the conductor 125 is also in the form of a negative-going pulse, and it is this signal that is supplied to the AND-gate 51. Accordingly, it is seen that the output signal from the amplifier 39 comprises a train of negative-going pulses having a frequency determined by the number of slots 35 in the timing disc 34 and by the speed of rotation of the timing disc. As noted hereinabove, this initial timing signal appearing at the terminal 124 must include $n$ pulses during each time interval in which a record card is moved through the sensing station by a distance equal to the average spacing D between adjacent data columns (see FIG. 1).

In FIG. 9, the start or "on" amplifier 43 is shown in detail together with the two control sensing elements 41 and 42, which in this instance comprise individual photodiodes. As shown therein, the cathode of the photodiode 41 is connected to the negative polarity unipotential operating source B−, the anode of this diode is connected to the cathode of the photodiode 42, and the anode of the photodiode 42 is connected to a terminal 131. The terminal 131 comprises the input terminal to the amplifier 43, and is connected to the base electrode 132 of a transistor 133 that is incorporated in an emitter follower circuit in the input stage of the amplifier.

The input circuit to the amplifier 43 further includes an input resistor 134 connected between the base electrode 132 and a plane of reference potential, here shown as ground, a bias resistor 135 being connected between the base electrode 132 and the DC source B–. The collector 136 of the transistor 133 is also connected to the source B–, whereas the emitter 137 is returned to ground through a load resistor 138.

The second stage of the amplifier 43 comprises a transistor 139 that is AC coupled to the first stage transistor 133, the base electrode 141 of the second stage transistor being coupled to the first stage emitter by means of a coupling capacitor 142. A bias resistor 143 is connected from the base electrode 141 back to the DC source B–. The emitter 144 of the second stage is connected to a positive-polarity bias source C+, whereas the collector 145 is returned to the negative DC source B– through a load resistor 146.

The final stage of the amplifier 43 comprises a third transistor 147 having a base electrode 148 that is connected to the collector 145 of the second stage. The emitter of the third stage transistor 147 is grounded, whereas the collector 149 is connected to the DC operating source B– by means of a load resistor 151. The output terminal of the third stage is designated by the reference numeral 152 and is connected to a conductor 153, which connects the output terminal of the "on" amplifier to the start-finish flip-flop 48 and also to the reset amplifier 49.

In considering the operation of the control sensing elements 41 and 42 and the "on" amplifier, as illustrated in FIG. 9, it must be remembered that the two photocells 41 and 42 are illuminated when there is no card in the sensing station 24 (see FIG. 1) and that the initial control signal generated by this portion of the control means is initiated by cutting off illumination to the photodiodes as the card moves into the sensing station. Thus, the initial condition of operation, before a card enters the sensing station, is one in which the impedance of the two diodes is relatively small, since they are subject to substantial illumination. Under these circumstances, the base electrode 132 in the initial stage of the amplifier 43 is maintained at a given negative potential which may be considered to be approximately the potential of the source B–, since the two diodes afford a very small impedance as compared with the resistor 135 and, in effect, shunt the impedance 135.

When a record card enters the sensing station, however, the leading edge of the card is effective to cut off illumination to one or both of the photodiodes 41 and 42 as described hereinabove. As soon as this happens, the effective resistance of the diode or diodes so darkened rises very rapidly, the nonilluminated impedance of the diodes being substantially larger than the resistor 135. Under these conditions, the potential of the base electrode 132 in the input through the amplifier 43 is driven positive, relative to its initial operating potential, since the potential on the base electrode is now determined by the ratio of the two resistances 134 and 135. Thus, a positive-going potential is applied to the emitter-follower comprising the transistor 133, and it is this signal which indicates the entrance of a card into the sensing station.

The output signal from the emitter-follower stage comprising the transistor 133 is also a positive-going signal, and appears as a positive pulse applied to the base electrode 141 of the next stage of the amplifier. Since the first and second stages are AC coupled, the input signal to the second stage is a relatively short pulse, the duration of the pulse being determined by the size of the capacitor 142 and the resistor 138. This control signal is amplified in the stage comprising the transistor 139 and appears as a negative-going pulse at the collector 145 of this stage. In the third and final stage of the amplifier, this pulse is again inverted in polarity and appears as a positive-going pulse at the output terminal 152. It is this signal which is applied to the reset amplifier 49 to the start-finish flip-flop 48.

In order to generate the necessary output signal from the start-finish flip-flop 48, it is also necessary to provide some signal which indicates the fact that a card has left the sensing station 24 (see FIG. 1). This circuit is illustrated in FIG. 7, which shows the two control sensing elements 45 and 46 as photodiodes connected to the "off" or finish amplifier 47. In this instance, the two diodes are connected in series with each other between the input terminal 155 of the amplifier 47 and ground. The input terminal 155 of the amplifier is connected to the base electrode 156 of a transistor 157 in the first stage of the amplifier 47, the terminal 155 also being connected to the operating source B– by means of a resistor 158 and to ground through a resistor 159. The emitter electrode 161 of the transistor 157 is returned to ground through a resistor 162, whereas the collector electrode 163 is connected to the operating source B– through a resistor 164. Both the emitter and the collector of the transistor 157 are connected to the base electrode 165 of a transistor 166 which comprises the second stage of the amplifier 47, the two coupling circuits being substantially similar. Thus, the emitter 161 of the first stage transistor 157 is AC coupled to the base electrode 165 through a circuit comprising in series, a coupling capacitor 167 and a diode 168; the common terminal of the capacitor 167 and the diode 168 is connected to the positive polarity bias source C+ through a diode 169. The emitter 163 of the first stage transistor is coupled to the base electrode 165 through a series circuit comprising a coupling capacitor 171 and a diode 172, the common terminal of these two elements being returned to the bias source C+ through an additional diode 173. A bias resistor 174 connects the base electrode 165 of the second stage back to the main DC source B–.

The emitter electrode 175 of the second stage transistor 166 is connected to the bias source C+, whereas the collector electrode 176 is connected to the source B– through a load resistor 177. The collector 176 is also connected to the base electrode 178 of a transistor 179 in the third stage of the amplifier 47. The emitter 181 of the third stage is grounded, whereas the collector 182 of this stage is connected to the source B– through a load resistor 183. The output terminal for the amplifier 47 is designated by the reference character 184, and is connected to a conductor 185 which connects the amplifier 47 to the start-finish flip-flop 48.

In considering the operation of the circuit of FIG. 7, it may first be assumed that both the photodiodes 45 and 46 are masked from their associated illumination sources by a record card, this being the operating condition whenever a record card is present in the sensing station. Under these circumstances, the impedances of the diodes are relatively high, with the result that the potential at the input terminal 155 of the "off" amplifier 47 is determined by the resistance ratio of the two resistors 158 and 159. When the trailing edge of the record card in the sensing station moves passed the two sensing diodes 45 and 46, however, the diodes are illuminated and their effective resistance is reduced to a value substantially smaller to that of the resistor 159. Consequently, the resistor 159 is effectively bypassed by a low-impedance conductive path, with the result that a positive-going signal is developed at the base electrode 156 of the first stage transistor 157 in the amplifier 47. Of course, one of the diodes 45 or 46 may be illuminated before the other, if the cutoff corner of the record card is disposed at the trailing edge thereof as the card is fed through the sensing mechanism, as described hereinabove. However, illumination of only one of the two photocells 45 and 46 is not effective to generate the aforementioned positive-going signal, since the impedance of either diode, when not illuminated, is made substantially greater than the resistance 159. Thus, a positive-going pulse is developed at the terminal 155 only when the trailing edge of the record card moves beyond both of the control sensing elements 45 and 46.

When a positive-going signal is developed in the input circuit of the "off" amplifier 47, a positive-going signal is developed across the emitter resistor 162 and is applied through the coupling circuit comprising the capacitor 167 and the diodes 168 and 169 to the base electrode 165 of the transistor 166. Since the coupling circuit is an AC coupling circuit, the signal applied to the electrode 165 is in the form of a pulse, the duration of the pulse being determined essentially by the circuit parameters of the capacitor 167 and the resistor 162. At the same time, a negative-going signal is developed across the resistor 164, but this signal is not effectively applied to the second stage of the amplifier, due to the presence of the blocking diode 172. The output from the second stage transistor 166 is in the form of negative-going pulse, and, or course, the output signal from the final stage of the amplifier is a positive-going pulse. Thus, each time a record card leaves the sensing station, a positive-going pulse signal is developed at the output terminal 184 of the amplifier 47 and is applied to the start-finish flip-flop 48.

Subsequently, when the next card entering the sensing station passes between the sensing elements 45 and 46 and their illumination source, as described hereinbefore, the impedance of the two diodes, or at least one of them, increases very substantially, with the result that a negative-going signal is developed at the input terminal 155. This negative-going signal, in amplified form, appears across the resistor 162 but is not applied to the second stage of the amplifier 47 because of the presence of the blocking diode 168. However, a positive-going signal is developed across the resistor 164, and this signal is applied, in a form of a positive-going pulse to the base electrode of the second stage transistor 166, through the coupling circuit comprising the capacitor 171 and the diode 172. As before, the signal is inverted in the second stage and again inverted in the third stage of the "off" amplifier 47, with the result that a positive-polarity signal is again applied to the flip-flop circuit 48 from the finish amplifier 47. However, this signal has no substantial effect upon operation of the start-finish flip-flop, since its effect is merely cummulative with respect to the signal applied thereto when the preceding card left the sensing station. However, the signal is useful, particularly when a sensing mechanism is placed in operation after having been quiescent for any period of time. Thus, it is not generally possible to predict which side of the start-finish flip-flop will be conductive when the circuits are first energized, and the signal applied to the start-finish flip-flop from the "off" amplifier 47 assures proper conditioning of the flip-flop for operation with respect to the first card fed through the sensing mechanism.

The start-finish flip-flop, as shown in FIG. 8, is a substantially conventional Eccles-Jordan trigger circuit. In fact, this circuit is essentially the same as that shown at page 15–40 of "Handbook of Semiconductor Electronics," McGraw Hill Book Company, Inc., 1956. Thus, the trigger circuit 48 comprises a pair of transistors 191 and 192; the emitter of each of the transistors is grounded. The collectors of the two transistors 191 and 192 are connected to the DC supply B– by means of individual resistors 193 and 194, respectively. The base electrode 195 of the transistor 191 is connected to the collector of the transistor 192 through a parallel RC circuit 197, whereas the base 196 of the transistor 192 is connected to the collector of the transistor 191 through a similar RC circuit 198. The base electrodes 195 and 196 are also connected to a positive-polarity unipotential source F+ by means of the resistors 199 and 200, respectively.

The input circuit for the transistor 191, sometimes referred to as a steering circuit, comprises a diode 201 which is connected in series with a resistor 203 between the base electrode 195 and a negative polarity DC source E–. A coupling capacitor 205 is connected between the common terminal of the circuit elements 201 and 203 and the output terminal 184 of the "off" amplifier 47 by means of the connecting line 185. The input steering circuit on the opposite side of the flip-flop is essentially similar and comprises a diode 202, a resistor 204, and a coupling capacitor 206, the coupling capacitor in this instance being connected back through the conductor 153 to the output terminal 152 of the "on" amplifier 43.

Operation of the flip-flop circuit 48 is substantially conventional. A positive polarity signal applied to the transistor 191 through the steering circuit comprising the capacitor 205 on the diode 201 is effective to drive the transistor 191 to cut off, rendering the transistor 192 conductive. With the transistor 192 conductive, the potential appearing at the output terminal 207 of the flip-flop circuit is very near to ground potential, since the transistor 192 represents a relatively low impedance under these conditions. This corresponds to a condition in which it is not desired to apply the initial timing signal from the timing means 33 to the countdown circuit 52 (see FIGS. 1 and 11), and the AND-gate 51 is maintained effectively closed so long as the output potential at the terminal 207, which constitutes the principal control signal for operating the AND gate, is not changed.

When a record card enters the sensing station, a positive-going signal pulse is applied to the input circuit comprising the capacitor 206, the resistor 204, and the diode 202 from the "on" control amplifier 43, as described hereinbefore. This positive pulse drives the transistor 192 to cut off and is effective to render the transistor 191 conductive in known manner. This being the case, the effective impedance of the transistor 192 is very high, and the potential at the terminal 207 drops to a value close to the negative potential of the source B–. That is, a negative-going output signal is developed at the terminal 207 and is applied to the AND-gate 51 through the conductive connection 208. This change in the output signal supplied to the AND gate from the flip-flop 48 is effective to condition the AND gate for transmission of the timing signal from the timing means 33 to the countdown circuit 52, as described hereinafter. It is thus seen that the final control signal appearing at the output terminal 207 is indicative of the presence or absence of a record card at the sensing station and that this control signal effectively actuates the coincidence circuit 51 to open and close the coincidences circuit for transmission of the initial timing signal from the timing means 33 to the countdown circuit 52.

When the record card leaves the sensing station, a negative pulse is developed at the output terminal 184 of the "off" amplifier 47 and is applied to the flip-flop 48 through the coupling capacitor 205. This "off" control signal is thus effective to condition the transistor 192 for conduction and to cut off the transistor 191. As a result, a positive-going signal is developed at the output terminal 207 of the trigger 48, again conditioning the AND-gate 51 to block transmission of the timing signal thereto. As noted hereinbefore, a similar signal is developed by the "off" amplifier 47 and applied to the trigger circuit 48 when a new card first approaches the sensing station. Normally, this signal has no effect upon the operating condition of the flip-flop circuit 48. If the sensing mechanism has just been energized, however, and it happens that the transistor 191 is conductive, this additional signal from the "off" amplifier 47 is effective to condition the flip-flop 48 for operation in the initial machine cycle, since the necessary positive pulse is developed as soon as the first card is fed into the sensing station.

The AND-gate 51, shown in FIG. 6, is quite simple in construction and essentially conventional in operation. The logical part of the circuit comprises a pair of diodes 211 and 212, the cathode of the diode 211 being connected by the line 125 to the output terminal 124 of the timing means amplifier 39 and the cathode of the diode 212 being connected to the output terminal 207 of the trigger circuit 48 by means of the line 208. The anodes of the two diodes are connected to each other and are connected to the control electrode 213 of an amplifier transistor 214 that forms the first stage in the amplification circuit of the gate 51. The base electrode 213 is also connected to the negative DC source B– by a bias resistor 215. The collector 216 of the transistor 214 is directly connected to the B– source and the emitter 217 is returned to ground through a load resistor 218. Thus, the transistor 214 is connected to the B– source and the emitter 217 is returned to ground through a load resistor 218. Thus, the transistor 214 is connected as an emitter follower.

The second stage of the amplifier portion of AND-gate 51 is also an emitter follower and comprises a transistor 219 having a collector 221 which is connected directly to the negative DC source B–, the emitter 222 being returned to ground through a load resistor 223. The coupling circuit between the two stages is an AC coupling circuit, and comprises a capacitor 224 connected between the emitter 217 of the first stage and the base electrode 225 of the second stage. The base electrode 225 is also returned to the B– source through a bias resistor 226. The output terminal of the AND-gate 51, terminal 227, is connected to the countdown circuit 52 of FIG. 11.

The operation of the input or AND circuit of the gate 51 is conventional, this circuit having been used in various forms in numerous other devices. Briefly, in order to apply an input signal to the base electrode 213 of the transistor 214, it is necessary that the cathodes of both of the diodes 211 and 212 be driven negative to a potential approximating that of the operating source B–. Thus, as long as the output terminal 207 is held near ground potential, as is the case when the transistor 192 is conductive (see FIG. 8), as described hereinabove, the negative-pulse timing signals from the timing means amplifier 39 are not effectively applied to the input electrode of the transistor 214 in the gate circuit. On the other hand, whenever the output signal appearing at the flip-flop output terminal 207 is highly negative, the transistor 192 being cut off, the train of pulses comprising the initial timing signal applied to the diode 211 is transmitted to the control electrode of the transistor amplifier 214. The pulse signal thus effectively applied to the first stage of the AND gate amplifier comprises negative-going pulses; that is, when both of the diodes 211 and 212 are driven to conduction, the potential at the input terminal 228 changes in a negative direction. Since the transistor 214 is connected as emitter follower, the output signal from the AND gate, across the resistor 218, is also in the form of a train of negative-going pulses. The pulse signal is differentiated in the input circuit of the second stage of the amplifier, producing both positive-going and negative-going pulses at the base 225. These pulses are amplified and used to actuate the countdown circuit 52 as described in connection with FIG. 11, the positive-going pulses comprising the significant output to the counter 52.

The reset amplifier 49 illustrated in FIG. 10 is quite simple in construction and includes a first transistor 231 having a base electrode 232 that is AC coupled to the output terminal 152 of the "on" amplifier 43 by means of a coupling capacitor 233 and the connecting line 153. The base electrode 232 is also connected to the negative DC source B– by a bias resistor 234. The emitter 235 of the transistor 231 is connected to the bias source C+, whereas the collector 236 is connected to the operating source B– by means of a load resistor 237. The collector 236 is also directly connected to the base electrode 238 of a second transistor 239, the emitter 241 of the second transistor being grounded. The collector 242 of this transistor is connected to the operating source B– by means of a load resistor 243 and is also connected by a coupling resistor 244 to the base electrode 245 of a third transistor 246. The resistor 244 forms a part of a voltage divider, being connected through a resistor 247 to the positive operating source F+. The collector of the third stage transistor 246 is connected to the countdown circuit 52, as clearly shown in FIG. 11 and also as indicated in FIG. 1. The reset amplifier 49 is also provided with another output circuit here shown as a coupling capacitor 248 connected to the collector 242 of the second stage and returned to the bias source E– by means of a resistor 249, this output circuit being connected to the storage matrix 55 to apply a reset signal thereto at the beginning of sensing of each card, thereby clearing the storage register for recording of new data.

Figure 11:
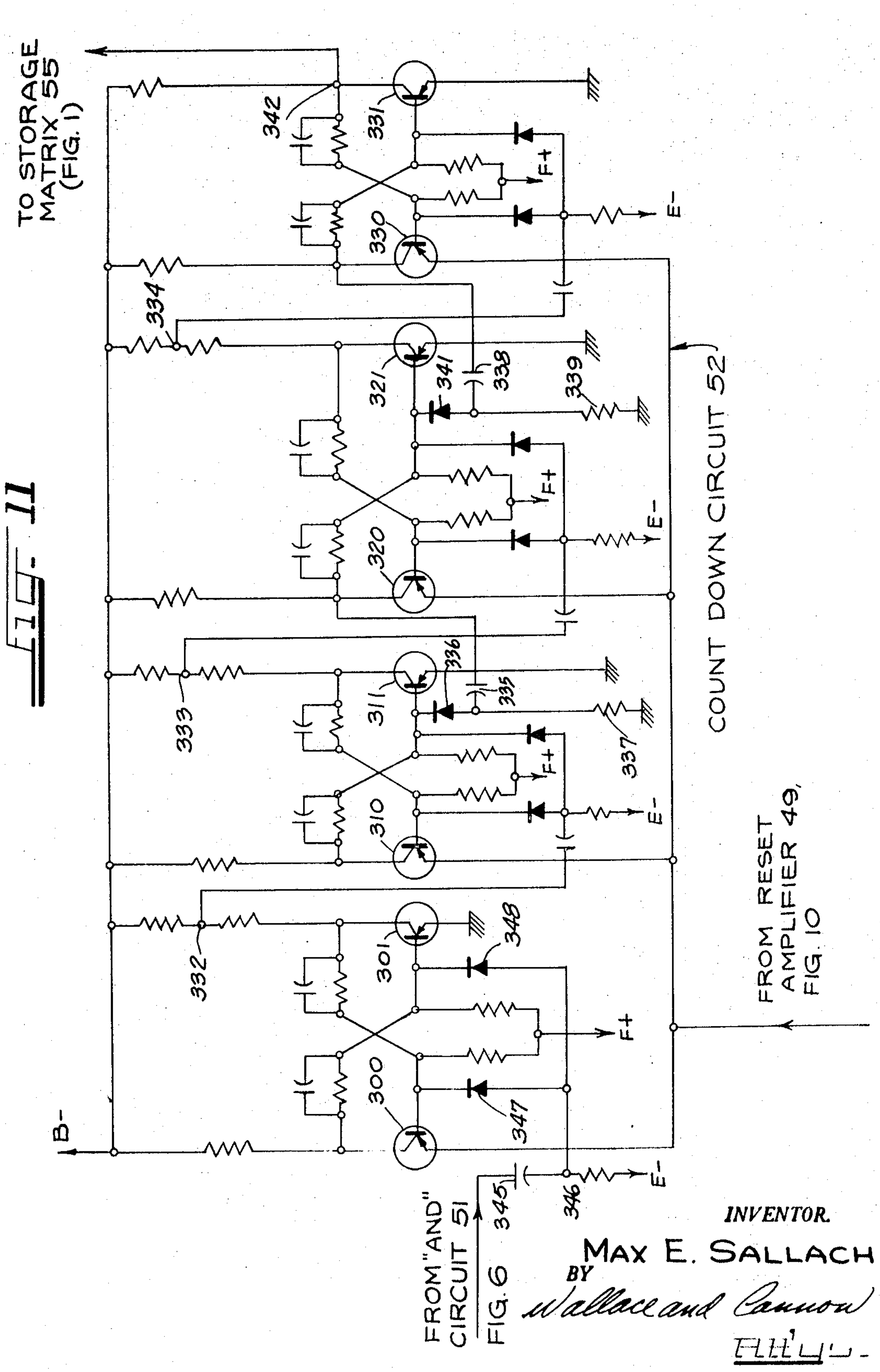
FIG. 11 is a detail schematic drawing of the countdown circuit employed in a preferred embodiment of the invention.

FIG. 11 illustrates the countdown circuit 52, which in this instance is a four-stage binary counter modified to afford a decimal count. Each of the four stages of the counter is a substantially conventional Eccles-Jordan trigger circuit, similar to that described hereinabove in connection with FIG. 8, the four circuits being connected in cascade to form four binary stages. Thus, the first or "ones" stage of the countdown circuit 52 comprises a pair of transistors 300 and 301 interconnected with each other in a conventional trigger circuit; the second or "twos" stage of the counter comprises the transistors 310 and 311, the third or "fours" stage of the counter includes the two transistors 320 and 321, and the fourth and final stage of the counter, the "eights" stage, comprises the two transistors 330 and 331. In the collector circuit of the second transistor 301 in the initial stage of the countdown circuit 52, there is provided an output terminal 332 which is connected in a conventional coupling circuit to the base electrodes of the transistors 310 and 311 in the next stage. Similarly, an output terminal 333 in the collector circuit of the second transistor of the second stage of the countdown circuit is connected to the base electrodes of the transistors in the third stage, by the same kind of coupling circuit, and an output terminal 334 in the collector circuit of the transistor 321 in the third stage of the counter is connected by a similar coupling circuit to the control electrodes of the transistors 330 and 331 in the final and fourth stage. It will be recognized that the countdown circuit 52, as thus far described, represents a binary counter for counting to the base 16. However, two additional interstage coupling circuits are provided in the counter which are effective to condition it for operation as a decimal counter. Thus, the collector of the initial transistor 320 in the third stage of the countdown circuit 52 is connected to the base electrode of the second transistor 311 in the second stage by means of a coupling circuit comprising a coupling capacitor 335 connected in series with a diode 336, the common terminal between the diode and the capacitor being returned to ground through a resistor 337. A similar coupling circuit, comprising a capacitor 338, a resistor 339, and a diode 341, is utilized to connect the base electrode of the second transistor 321 in the third or "fours" stage of the counter to the collector electrode of the initial transistor 330 in the final counter stage.

The output terminal of the countdown circuit 52 is designated by the reference numeral 342, and is located in the collector circuit of the second transistor 331 in the final stage of the counter; the terminal 342 is connected by a suitable circuit to the storage matrix 55 (see FIG. 1) and is effective to apply a signal pulse to the storage matrix each time 10 signal pulses are applied to the counter from the AND-circuit 51 of FIG. 6. Thus, in this embodiment of the invention, the countdown circuit 52 has a countdown factor of one-tenth, this being necessitated by the fact that the initial timing signal supplied thereto from the timing means 33 develops ten output pulses each time a record card is moved through a sensing station by a distance equal to the inner column spacing D.

There are two input circuits to the countdown circuit 52, one for applying the initial timing signal from the coincidence circuit 51 and the other for effectively applying a reset signal to the counter from the reset amplifier 49. The initial input circuit from the AND-gate 51 comprises a coupling capacitor 345 which is connected to the output terminal 227 of the AND gate (see FIG. 6) and which is returned to the negative bias source E– through a resistor 346, the common terminal of the resistor 346 and the capacitor 345 being connected through a pair of diodes 347 and 348 to the base electrodes of the transistors 300 and 301 in the initial stage of the countdown circuit. The input stage of the counter, which applies the initial timing signal pulses to the counter, comprises a conventional steering circuit for the trigger comprising the transistors 300 and 301. The input circuit from the reset amplifier 49 of FIG. 10, on the other hand, comprises a direct connection from the collector of the final stage transistor 246 in the reset amplifier to the emitter electrodes of each of the transistors 300, 310, 320 and 330. Thus, the ground return circuit for the initial stage of each of the four trigger circuits in the countdown circuit 52 is made through the transistor 246 in the reset amplifier circuit. In normal operation, the transistor 246 is maintained conductive, so that the emitter circuit for the countdown trigger transistors 300, 310, 320 and 330 are effectively grounded, but the reset amplifier operates to cut off the transistor 246, upon application of a reset signal thereto from the "on" amplifier 43 of FIG. 9, to condition the countdown circuit 52 for a new counting operation at the beginning of each sensing cycle.

As noted hereinabove, the countdown circuit 52 is substantially conventional in character; accordingly, operation of the counter need not be described in detail herein. Initially, it may be considered that the countdown circuit 52 is a counter which counts to the base 16 except for the two count-advancing circuits 335–337 and 338–341 incorporated therein. These count-advancing circuits are effective to advance the count, in known manner, once in the second or "twos" stage and once in the "fours" stage, during each counting operation, and thus are effective to condition the circuit 52 for operation as a decade counter. When the counter is started in operation the first nine pulses applied thereto from the coupling or steering circuit 345–348 produce no significant output signal at the output terminal 342, a significant output signal in this instance constituting a positive-going signal pulse. The tenth input pulse applied to the countdown circuit 52, however, is effective to develop a positive-going output signal pulse at the terminal 342, and it is this signal which is applied to the matrix 55 to condition the matrix for recordation of data from one column of a record card or similar business instrument. This tenth pulse also conditions the countdown circuit 52 to begin a new counting operation, effectively resetting the counter to its initial or "zero" condition. The reset signal applied to the countdown circuit from the amplifier 49 of FIG. 10 is also effective to accomplish the latter purpose, conditioning the countdown circuit for the beginning of a counting operation. It is thus seen that the output signal appearing at the terminal 342 comprises a train of signal pulses comprising one signal pulse occurring during each time interval in which the transport moves a record card through a distance equal to the data column spacing D (see FIG. 1). Of course, and as explained hereinbefore, a decade counter is utilized in this instance because the initial timing signal supplied from the AND-circuit 51 includes $n$=10 output pulses during each sensing interval; if some other number $n$ is utilized as the timing factor for the initial timing signal developed by the timing means 33, the circuit 52 must of course be constructed to have a different countdown factor equal to $1/n$.

The present invention is not dependent upon the use of a particular kind of counter as the countdown circuit 52; any one of a number of different types of counter may be employed for this purpose without substantial change in the operation of the sensing system 20 (FIG. 1). For example, a magnetic beam switch tube counter can be utilized as the countdown device 52, or a ring counter may be employed if desired. Thus, the circuit of FIG. 11 is shown only as a specific example of one counter which can be employed satisfactorily in this part of the sensing system, and it should be understood that other devices may be substituted, as desired, to perform the same function.

Figures 12, 13:
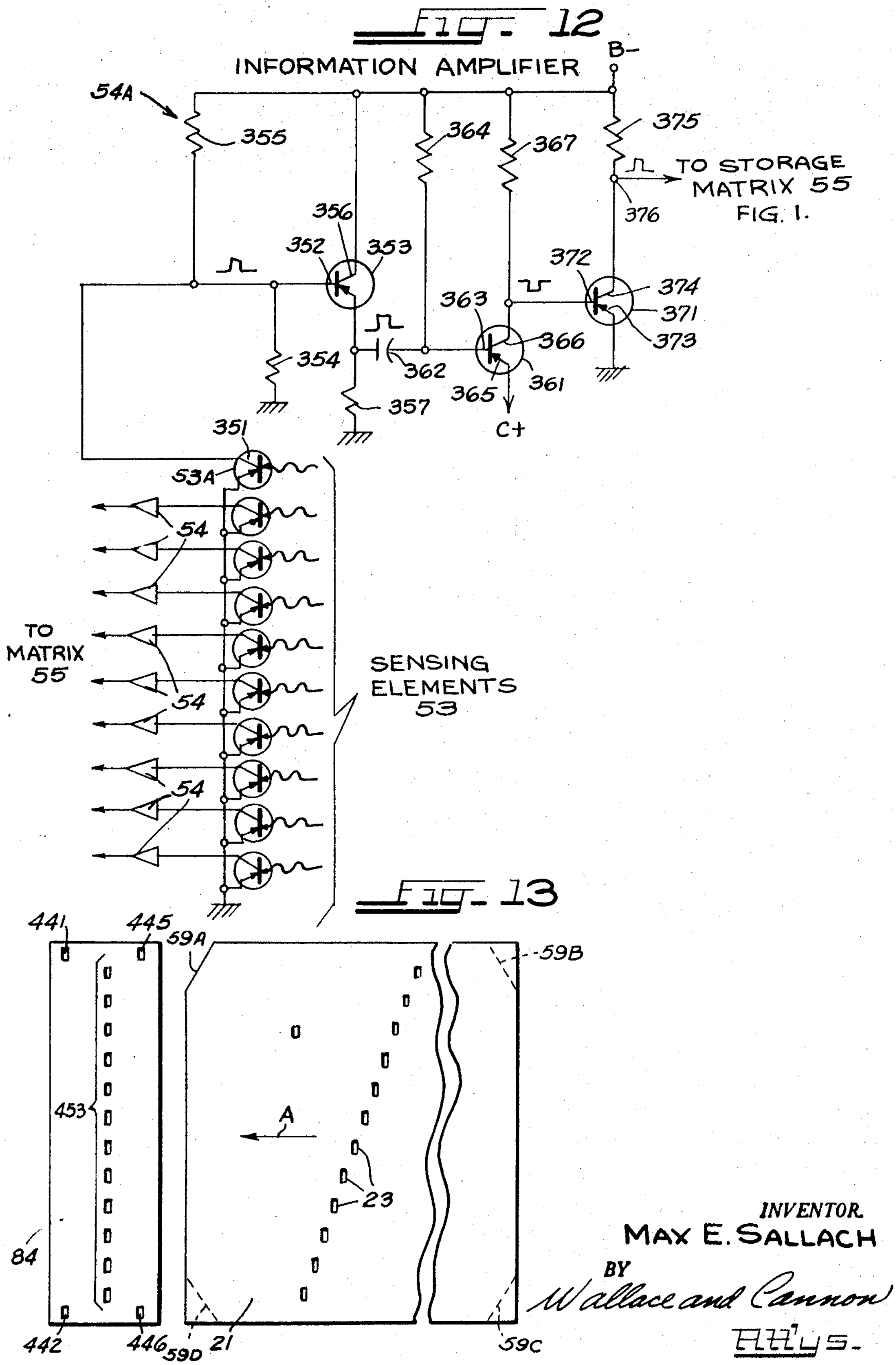
FIG. 12 is a detail schematic drawing of a particular sensing means which may be utilized in connection with the invention.
FIG. 13 is a layout drawing illustrating the relative positions of the sensing elements used in the circuits of FIGS. 7, 9, and 12 in sensing a particular kind of record card.

FIG. 12 illustrates the data sensing elements 53 in relation to the individual amplifiers of the amplifier unit 54, a detailed circuit diagram being shown for one of the information amplifiers, designated in FIG. 12 as amplifier 54A. As shown in FIG. 12, the sensing elements 53 may comprise individual photosensitive transistor devices. The emitter of each of the phototransistors 53 is grounded, whereas the collector of each of the phototransistors is coupled to the associated amplifier 54. Thus, the collector 351 of the sensing element 53A is connected to the base electrode 352 of a first stage transistor 353 in the amplifier 54A. The input circuit to the transistor 353 includes an input resistor 354 which is returned to a plane of reference potential, here indicated as ground. The base 352 is also connected by a bias resistor 355 to the negative-polarity DC operating source B–. The collector 356 of the transistor 353 is directly connected to the source B–, whereas the emitter is returned to ground through a resistor 357.

The initial stage of the amplifier 54A comprises an emitter follower and is AC coupled to a second stage transistor 361 by means of a coupling capacitor 362 which is connected to the base electrode 363 of the transistor 361. The base electrode 363 is also returned to the negative-polarity operating source B– through a resistor 364. The emitter 365 of the second stage transistor is connected to the positive bias source C+, whereas the collector 366 is returned to the operating source B– through a load resistor 367.

The third stage of the amplifier 54A comprises a transistor 371 having a base electrode 372 that is directly connected to the collector 366 in the second stage. The emitter 373 of the third stage transistor is grounded. The collector 374 of this stage is connected to the DC source B– by means of a load resistor 375. The output terminal 376 of the information amplifier 54A is in the collector circuit of the third stage transistor 371, and is connected to the storage matrix 55 (see FIG. 1), in conventional manner.

It is thus seen that the information amplifier 54A is substantially conventional in construction and comprises a first emitter follower stage followed by a pair of grounded-emitter stages, the first and second stages of the amplifier being AC coupled and the second and third stages being DC coupled. Thus, the amplifier is essentially the same as the "on" amplifier of FIG. 9 except that the sensing element 53A is connected in the input circuit in a slightly different manner to afford the desired signal polarity in the input to the amplifier. During a sensing operation, the sensing elements 53 are normally masked by the record card, so that the illumination thereof is essentially negligible. When one of the data apertures 23 is located over a given sensing element 53, such as the element 53A, the phototransistor is actuated from a normal high-impedance condition to a low-impedance condition. When this occurs, a positive-going pulse is developed on the base electrode 352 in the initial stage of the amplifier 54A. This pulse is amplified in the circuit 54A and appears as a positive-going output signal at the output terminal 376. Of course, if negative-going signals are desired to actuate the storage elements in the matrix 55, it is a simple matter to change the connection of the sensing element 53 in the input circuits of the amplifiers 54 to obtain negative-going output signals from the information amplifiers. Furthermore, it is not essential to use phototransistors as the sensing elements 53; photodiodes can, of course, be used for this purpose if desired, and this is also true of the device 38 of FIG. 5.

In order to afford a more complete description of the various operating circuits illustrated in FIGS. 5–12, certain specific circuit data are set forth in tabular form hereinafter. It should be understood that these data are supplied solely in order to give a specific example of a particular group of circuits which afford satisfactory operation, and in no sense as a limitation upon the invention, since each of these circuits may be modified to afford desired signal polarities, amplitudes, and other factors, in known manner, depending upon the nature of the output signals required to operate associated devices such as the storage matrix 55.

PHOTOSENSITIVE SENSING ELEMENTS

| | |
|---|---|
| Transistors 38' and 53 | TI 800 |
| Diodes 41, 42, 45, 46 | IN 77A |

AMPLIFIER AND SWITCHING TRANSISTORS AND DIODES

| | |
|---|---|
| All diodes | HD-2257 |
| Transistors 133, 157 | 2N414 |
| All other transistors | 2N382 |

VOLTAGE SUPPLIES

| | |
|---|---|
| B– | –20 volts |
| C+ | +3 volts |
| E– | –3 volts |
| F+ | + 12 volts |

AMPLIFIER 39

| | |
|---|---|
| Resistor 103 | 68 kilohms |
| Resistor 104 | 47 kilohms |
| Resistor 109 | 15 kilohms |
| Resistor 114 | 470 kilohms |
| Resistor 116 | 56 kilohms |
| Resistor 123 | 4.7 kilohms |
| Capacitor 113 | 0.02 microfarads |

AMPLIFIER 43

| | |
|---|---|
| Resistors 134, 135 | 560 kilohms |
| Resistor 138 | 15 kilohms |
| Resistor 143 | 470 kilohms |
| Resistor 146 | 56 kilohms |
| Resistor 151 | 4.7 kilohms |
| Capacitor 142 | 0.02 microfarads |

AMPLIFIER 47

| | |
|---|---|
| Resistors 158, 159 | 560 kilohms |
| Resistors 162, 164 | 15 kilohms |
| Resistor 174 | 470 kilohms |
| Resistor 177 | 56 kilohms |
| Resistor 183 | 4.7 kilohms |
| Capacitors 167, 171 | 0.02 microfarads |

TRIGGER 48

| | |
|---|---|
| Resistors 193, 194 | 4.7 kilohms |
| Resistors 199, 200 | 22 kilohms |
| Resistors 203, 204 | 47 kilohms |
| R–C Circuits 197, 198: | |
| Resistance | 18 kilohms |
| Capacitors | 0.002 microfarads |
| Capacitors 205, 206 | 0.01 microfarads |

RESET AMPLIFIER 49

| | |
|---|---|
| Resistor 234 | 47 kilohms |
| Resistors 237, 244 | 10 kilohms |
| Resistor 243 | 1 kilohm |
| Resistor 247 | 100 kilohms |
| 233 | 0.0022 microfarads |

AMPLIFIER 51

| | |
|---|---|
| Resistor 215 | 120 kilohms |
| Resistor 218 | 12 kilohms |
| Resistor 223 | 1 kilohm |
| Resistor 226 | 47 kilohms |
| Capacitor 224 | 0.0015 microfarads |

FIG. 13 shows the distribution and arrangement of the sensing element apertures in the mask 84 overlying these elements, the position of the mask 84 being described hereinabove in connection with FIG. 2. In FIG. 13, the openings for the two "on" control elements 41 and 42 are shown at 441 and 442, whereas the apertures 445 and 446 are for the two "off" control elements 45 and 46. The data sensing elements are located behind the apertures 453. Preferably, the control apertures 441, 442, 445 and 446 are located beyond the end of the row of data apertures 453, this position being selected to prevent incorrect actuation of the control sensing elements by any of the data apertures 23 in the card 21. The cutoff corner 59 of the card 21 may be located at any of the positions 59A, 59B, 59C, or 59D without affecting operation of the sensing mechanism, as explained hereinabove in connection with FIGS. 7 and 9.

From the foregoing description, it is seen that the sensing mechanism or card reader of the invention is essentially self-synchronizing and operates accurately despite substantial variations in the intercolumn spacing of the data on the record cards or similar business instruments being sensed. By the same token, the high-speed sensing apparatus of the invention is also effective to compensate for substantial variations in the location of the initial data column relative to the leading edge of the business instrument as it enters the sensing station. The record cards can be fed into the sensing station without regard to the location of the cutoff corner thereof, where conventional tabulating cards are being sensed. Operation of the sensing mechanism is completely independent of the spacing between business instruments as they are fed into the sensing station and fluctuations in the speed of the card transport do not affect the sensing operation adversely because the timing means of the invention is effective to modify the control signal indicative of card position in proportion to any such changes in card speed.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A sensing mechanism for reading data indications from record cards or similar business instruments each having a plurality of data columns each spaced from the adjacent columns by a given distance, said mechanism comprising: a card transport for moving said record cards one-by-one past a sensing station; timing means, operating in synchronism with said card transport, for generating an initial timing signal comprising *n* signal pulses occurring during each time interval in which said transport moves a record card by a distance equal to said data column spacing distance, *n* being an integer greater than one; control means for generating a control signal indicative of the presence of a record card at said sensing station; a countdown circuit, having a countdown factor of 1/*n*, for developing a second timing signal; gate means for applying said initial timing signal to said countdown circuit only upon occurrence of said control signal; a reset circuit, coupled to said control means and to said countdown circuit, for resetting said countdown circuit to zero each time upon initiation of said control signal; data sensing means for sensing said data indications on said cards, as said cards move past said sensing station, and generating data signals representative thereof; and data utilization means, coupled to said data sensing means and to said countdown circuit, for utilizing said second timing signal and said data signals conjointly to interpret said data.

2. A sensing mechanism for reading data indications from record cards or similar business instruments each having a plurality of data columns each spaced from the adjacent columns by a given distance, said mechanism comprising: a card transport for moving said record cards one-by-one past a sensing station; timing means, operating in synchronism with said card transport, for generating an initial timing signal comprising *n* signal pulses occurring during each time interval in which said transport moves a record card by a distance equal to said data column spacing distance, *n* being an integer greater than one; control means for generating a control signal indicative of the presence of a record card at said sensing station, said control means including first and second sensing devices for sensing the entrance of a card into said sensing station and the exit of a card from said sensing station, respectively; a countdown circuit, having a countdown factor of 1/*n*, for developing a second timing signal; gate means for applying said initial timing signal to said countdown circuit only upon occurrence of said control signal; a reset circuit, coupled to said control means and to said countdown circuit, for resetting said countdown circuit to zero each time upon initiation of said control signal; data sensing means for sensing said data indications on said cards, as said cards move past said sensing station, and generating data signals representative thereof; and data utilization means, coupled to said data sensing means and to said countdown circuit, for utilizing said second timing signal and said data signals conjointly to interpret said data.

3. A sensing mechanism for reading data indications from record cards or similar business instruments each having a plurality of data columns each spaced from the adjacent columns by a given distance, said mechanism comprising: a card transport for moving said record cards one-by-one past a sensing station; timing means, operating in synchronism with said card transport, for generating an initial timing signal comprising *n* signal pulses occurring during each time interval in which said transport moves a record card by a distance equal to said data column spacing distance, *n* being an integer greater than one;

control means for generating a control signal indicative of the presence of a record card at said sensing station, said control means including a control sensing element for developing a starting signal in response to the movement of the leading edge of a card past a predetermined point in said sensing station; a countdown circuit, having a countdown factor of $1/n$, for developing a second timing signal; gate means for applying said initial timing signal to said countdown circuit only upon occurrence of said control signal; a reset circuit, coupled to said control sensing element and to said countdown circuit, for resetting said countdown circuit to zero in response to said starting signal; data sensing means for sensing said data indications on said cards, as said cards move past said sensing station, and generating data signals representative thereof; and data utilization means, coupled to said data sensing means and to said countdown circuit, for utilizing said second timing signal and said data signal conjointly to interpret said data.

4. A card-reading apparatus for reading data indications from record cards each having a plurality of data columns each spaced from the adjacent column by a given distance, said apparatus comprising: a card transport, including drive means, for moving said record cards one-by-one past a sensing location; timing means, operatively connected to said card transport drive means for operation in synchronism with said card transport, for generating an initial timing signal comprising $n$ output pulses occurring during each time interval in which said transport moves a record card by a distance equal to said data column spacing distances, $n$ being an integer greater than one; control means for generating a control signal indicative of the presence of a record card at said sensing location; a countdown circuit, having a countdown factor of $1/n$, for developing a second timing signal; a coincidence circuit, connected between said timing means and said countdown circuit and coupled to said control means, for applying said timing signal to said countdown circuit only in the presence of said control signal; a reset circuit, coupled to said control means and to said countdown circuit, for resetting said countdown circuit to zero each time upon initiation of said control signal; data sensing means for sensing said data indications on said cards as said cards move past said sensing location and generating data signals representative thereof; and data utilization means, coupled to said data sensing means and to said countdown circuit, for utilizing said second timing signal and said data signals to interpret said data.

5. A sensing mechanism for reading data indications from record cards or similar business instruments each having a plurality of data columns each spaced from the adjacent columns by a given distance, said mechanism comprising: a card transport for moving said record cards one-by-one past a sensing station; timing means, operating in synchronism with said card transport, for generating an initial timing signal comprising $n$ signal pulses occurring during each time interval in which said transport moves a record card by a distance equal to said data column spacing distance, $n$ being an integer greater than one; control means for generating a control signal indicative of the presence of a record card at said sensing station, said control means including a trigger circuit, first card presence sensing means to actuate said trigger circuit from an initial conductive state to a second conductive state when a card enters the sensing station far enough so that the first column of data on each card is located in a predetermined position in said sensing station, and a second card presence sensing means to actuate said trigger back to said initial state when the last column of data on each card passes said position as the card leaves the sensing station; a countdown circuit, having a countdown factor of $1/n$, for developing a second timing signal; a gate circuit, connected to said trigger circuit, said timing means, and said countdown circuit, for applying said initial timing signal to said countdown circuit only upon occurrence of said control signal; a reset circuit, coupled to said control means and to said countdown circuit, for resetting said countdown circuit to zero each time upon initiation of said control signal; data sensing means for sensing said data indications on said cards, as said cards move past said sensing station, and generating data signals representative thereof; and data utilization means, coupled to said sensing means and to said countdown circuit, for utilizing said second timing signal and said data signals conjointly to interpret said data.

6. A timing system for a sensing mechanism for reading data indications from record cards or similar business instruments each having a plurality of data columns each spaced from each other by a given distance D, and in which said data indications are sensed column-by-column as said record cards are moved through a sensing station, said timing system comprising: means for generating an initial timing signal comprising $n$ signal pulses occurring during each time interval in which said cards are moved through said distance D, $n$ being an integer greater than one; a countdown circuit having a countdown factor of $1/n$; and synchronizing means for applying said initial timing signal to said countdown circuit to develop a final timing signal, comprising one signal pulse in each said interval, only when a card is being moved through said sensing station, said synchronizing means including means for sensing the entrance of a record card into said sensing station to develop a reset signal and reset means for resetting said countdown circuit to zero in response to said reset signal.

7. A timing system for a sensing mechanism for reading data indications from record cards or similar business instruments each having a plurality of data columns each spaced from each other by a given distance D, and in which said data indications are sensed column-by-column as said record cards are moved by a card transport mechanism through a sensing station, said timing system comprising: initial timing means for continuously generating an initial timing signal comprising $n$ signal pulses occurring during each time interval in which said cards are moved through said distance D, $n$ being an integer greater than one, said initial timing means including a rotatable timing disc having a multiplicity of alternate transparent and opaque areas equally spaced around the periphery thereof, drive means for driving said card transport and said disc in synchronism with each other, and a photoelectric sensing element disposed in proximity to said disc in position to be alternately illuminated and masked by said transparent and opaque areas of said disc; a countdown circuit having a countdown factor of $1/n$; and synchronizing means for applying said initial timing signal to said countdown circuit to develop a final timing signal, comprising one signal pulse in each said interval, only when a card is being moved through said sensing station, said synchronizing means including means for sensing the entrance of a record card into said sensing station to develop a reset signal and reset means for resetting said countdown circuit to zero in response to said reset signal.

8. A timing system for a sensing mechanism for reading data indications from record cards or similar business instruments each having a plurality of data columns located in a predetermined area of the card, said columns each being spaced from each other by a given distance D, and in which said data indications are sensed column-by-column as said record cards are moved through a sensing station, said timing system comprising: means for generating an initial timing signal comprising $n$ signal pulses occurring during each time interval in which said cards are moved through said distance D, $n$ being an integer greater than one; a countdown circuit having a countdown factor of $1/n$; control means, including a pair of control sensing elements located at said sensing station in position to be actuated by portions of each of said cards outside of said predetermined area, for generating a control signal indicative of the presence of a record card in said sensing station; and synchronizing means, comprising a gate circuit coupled to said control means and responsive to said control signal, for applying said initial timing signal to said countdown circuit to develop a final timing signal, comprising one signal pulse in each said interval, only when a card is being moved through said sensing station, said synchronizing means further including means for sensing the entrance of a record card into said sensing station to develop a reset signal and reset means for resetting said countdown circuit to zero in response to said reset signal.

9. A timing system for a sensing mechanism for reading data indications from record cards or similar business instruments each having a plurality of data columns each spaced from each other by a given distance D, and in which said data indications are sensed column-by-column as said record cards are moved through a sensing station by a card transport mechanism, said timing system comprising: initial timing means for continuously generating an initial timing signal comprising *n* signal pulses occurring during each time interval in which said cards are moved through said distance D, *n* being an integer greater than one, said initial timing means comprising a commutator device mechanically coupled to and driven by said card transport mechanism at a speed directly proportional to the speed of operation of said card transport; a countdown circuit having a countdown factor $1/n$; control means, including a pair of control sensing elements located at said sensing station in position to be actuated by portions of each of said cards outside of said predetermined area, for generating a control signal indicative of the presence of a record card in said sensing station; and means, comprising a gate circuit coupled to said control means and responsive to said control signal, for applying said initial timing signal to said countdown circuit to develop a final timing signal, comprising one signal pulse in each said interval, only when a card is being moved through said sensing station, said synchronizing means further including means for sensing the entrance of a record card into said sensing station to develop a reset signal and reset means for resetting said countdown circuit to zero in response to said reset signal.

10. Apparatus for reading record cards each having a plurality of data recording positions arranged in rows and columns, including a plurality of spaced apart sensing devices, one for sensing each row of recording positions on a card, means for feeding the record cards seriatim column-by-column past the sensing devices, means connected to the sensing devices for deriving from the sensing devices a synchronizing signal indicative of the passage of the leading edge of each card past the sensing devices, a source of clock pulses connected to and operating in synchronism with said feeding means, a pulse counter connected to said clock pulse source and responsive to the clock pulses to cycle during the sensing of each column thereby generating a train of output pulses, the time interval between successive output pulses being the time interval between the sensing of adjacent columns of a card, and means for applying each synchronizing signal to the counter to reset it to zero thereby resynchronizing said output signals to the card feeding means for the reading of each card.

11. In a reader for cards having perforations therethrough arranged in substantially evenly spaced rows and columns and having the leading edge of the card positioned a reference distance from the first column of perforations thereon, a reading station and means for serially advancing such a card column-by-column through the reading station, said reading station including photoreading means for reading each column of perforations on such card and further including photodetection means on one side of said reading means for sensing the presence of the card and so positioned with respect to the reading means as to provide a presence signal signifying the passage of the leading edge of the card thereby in advance of the arrival of the first column of perforations at the reading means; means synchronized with the movement of the card for developing a plurality of timing signals, at a frequency *f*, corresponding to predetermined increments of the advancement of the card through said reading station; control circuit means coupled to said photodetection means and including a counter coupled to said synchronizing means and operable when initiated to count the timing signals and to provide a unique output signal of frequency $f/n$ after a predetermined number *n* of timing signals occur, the number *n* of such timing signals corresponding substantially to the distance between two adjacent columns of perforations on the card, said control circuit means further including gating means responsive to the signal from the detection means signifying the passage of the leading edge of the card for initiating the operation of the counter so that upon the arrival of the first column of perforations at the reading means the predetermined number of signals will have been counted, causing said unique output signal to be initiated; a reset circuit, coupled to said photodetection means and to said counter, for resetting said counter each time upon initiation of said presence signal and data utilization means, coupled to said photoreading means and to said counter, for utilizing said unique output signal for timed interpretation of the data represented by the reading of said card perforations.

* * * * *